US012601541B2

(12) United States Patent
Lee

(10) Patent No.: US 12,601,541 B2
(45) Date of Patent: Apr. 14, 2026

(54) REEL-TO-REEL COMPONENT DRYING APPARATUS

(71) Applicant: HAESUNG DS CO., LTD., Gyeongsangnam-do (KR)

(72) Inventor: Seung Seob Lee, Gyeongsangnam-do (KR)

(73) Assignee: HAESUNG DS CO., LTD., Gyeongsngnam-Do (KR)

( * ) Notice: Subject to any disclaimer, the term of this patent is extended or adjusted under 35 U.S.C. 154(b) by 798 days.

(21) Appl. No.: 17/930,465

(22) Filed: Sep. 8, 2022

(65) Prior Publication Data

US 2023/0097759 A1 Mar. 30, 2023

(30) Foreign Application Priority Data

Sep. 30, 2021 (KR) ........................ 10-2021-0130302

(51) Int. Cl.
*F26B 3/28* (2006.01)
*F26B 3/30* (2006.01)
*F26B 13/14* (2006.01)

(52) U.S. Cl.
CPC ................ *F26B 3/283* (2013.01); *F26B 3/30* (2013.01); *F26B 13/145* (2013.01)

(58) Field of Classification Search
CPC .......... F26B 3/283; F26B 3/30; F26B 13/145; F26B 13/10; F26B 13/003; F26B 13/08; F26B 13/105; F26B 13/12; F26B 3/04; F26B 21/004; H05K 3/064
USPC ............................................................ 34/267
See application file for complete search history.

(56) References Cited

U.S. PATENT DOCUMENTS

| | | | | |
|---|---|---|---|---|
| 3,231,985 A * | 2/1966 | Smith, Jr. | F26B 13/08 | |
| | | | 34/448 | |
| 6,007,465 A * | 12/1999 | Kawamura | D01F 9/32 | |
| | | | 432/60 | |
| 6,739,039 B2 | 5/2004 | Choi et al. | | |
| 2010/0269366 A1* | 10/2010 | Kitamoto | F26B 3/283 | |
| | | | 34/636 | |

FOREIGN PATENT DOCUMENTS

| | | | |
|---|---|---|---|
| CN | 107309140 | 11/2017 | |
| CN | 207204522 | 4/2018 | |
| JP | 2004330560 | 11/2004 | |
| KR | 20020049218 | 6/2002 | |
| KR | 20090122798 | 12/2009 | |
| KR | 20090122798 A * | 12/2009 | B41F 23/04 |
| KR | 20100037224 | 4/2010 | |

* cited by examiner

*Primary Examiner* — John P McCormack
(74) *Attorney, Agent, or Firm* — Perman & Green, LLP

(57) ABSTRACT

Disclosed is an apparatus for drying a component transferred in a reel-to-reel method. The apparatus for drying a component transferred in a reel-to-reel method includes an uncoiler and a recoiler, both for transferring the component, a drying chamber disposed between the uncoiler and the recoiler and drying the component, wherein the drying chamber includes an inner space, a transfer roller for transferring the component; an infrared drier for irradiating infrared light toward the component, and a hot air supplier for supplying hot air between the infrared drier and the component.

10 Claims, 5 Drawing Sheets

REEL-TO-REEL COMPONENT DRYING APPARATUS

CROSS-REFERENCE TO RELATED APPLICATION

This application claims the benefit of Korean Patent Application No. 10-2021-0130302, filed on Sep. 30, 2021, in the Korean Intellectual Property Office, the disclosure of which is incorporated herein in its entirety by reference.

BACKGROUND

1. Field

The disclosure relates to an apparatus for drying a component transferred in a reel-to-reel method, and more particularly, to a reel-to-reel component drying apparatus which efficiently dries components.

2. Description of the Related Art

Photo solder resist (PSR) ink for coating a substrate surface is used to allow an electrical signal to flow only through a specific part of a substrate. When a substrate is coated with PSR ink, the substrate is preliminary dried and then pressed by using a roller, a surface pressure press, and the like to improve flatness of the PSR ink, and exposure, development, and curing processes are carried out to finalize the substrate.

A drying apparatus is used in a preliminary drying process and a curing process. The drying apparatus dries a substrate on which the PSR ink is coated to volatilize a solvent included in the ink (preliminary drying process), or completely cures the PSR (curing process).

However, in the case of an apparatus for drying a reel-to-reel type substrate according to the related art, as implementation of uniform heat transfer is difficult in a drying chamber, a temperature distribution may vary in the central portion and the edge portion of the substrate, and as maintaining a uniform height of a substrate is difficult, local drying may easily occur. Furthermore, the PSR ink coated on the substrate may adhere to a transfer device, thereby causing contamination.

The background description above is technology information that the inventor possessed for the derivation of the disclosure or acquired in the derivation process of the disclosure, and it cannot be said that it is a known technology disclosed to the general public before the filing of the present application.

PRIOR ART DOCUMENT

Patent Literature (Patent Literature 1) Korean Patent Publication No. 10-2002-0049218 A

SUMMARY

Provided is an apparatus for uniformly drying a component transferred in a reel-to-reel method.

However, such an objective is exemplary, and the objective of the present disclosure to solve is not limited thereby.

Additional aspects will be set forth in part in the description which follows and, in part, will be apparent from the description, or may be learned by practice of the presented embodiments.

According to an aspect of the disclosure, an apparatus for drying a component transferred in a reel-to-reel method includes an uncoiler and a recoiler, both for transferring the component, a drying chamber disposed between the uncoiler and the recoiler and drying the component, wherein the drying chamber includes an inner space, a transfer roller for transferring the component, an infrared drier for irradiating infrared light toward the component, and a hot air supplier for supplying hot air between the infrared drier and the component.

In an embodiment, the infrared drier may include a pair of infrared driers disposed in the height direction to face each other with the transfer roller therebetween.

In an embodiment, the hot air supplier may include, in the drying chamber, a hot air supply duct disposed between the transfer roller and the infrared drier, a hot air supply pump for supplying hot air from an outside into the hot air supply duct, and a discharge device for discharging the hot air inside the drying chamber to the outside.

In an embodiment, the hot air supply duct may extend from a rear end to a front end of the drying chamber to reverse a transfer direction of the component.

In an embodiment, the drying chamber may include a plurality of drying chambers, and each of the plurality of drying chambers may include the height measurement device for measuring an average height of the component in the width direction, the height measurement device being disposed close to an adjacent drying chamber.

In an embodiment, the apparatus may further include the height adjustment device for controlling the height of the transfer roller based on the average height measured by the height measurement device.

In an embodiment, the apparatus may further include a tension adjustment device disposed in the uncoiler or the recoiler and adjusting a tension of the uncoiler or the recoiler based on the average height measured by the height measurement device.

In an embodiment, the tension adjustment device may be disposed in a rear end of the uncoiler or in a front end of the recoiler, and may include a buffer roller moving in the height direction.

In an embodiment, the apparatus may further include a cooling chamber disposed in a rear end of the drying chamber and cooling the component.

In an embodiment, the component may include a product area protruding from a base and a dummy area disposed between neighboring product areas, the product area and the dummy area being alternately disposed, and the transfer roller may include a plurality of steps formed not to contact the product area but to contact the dummy area only.

Other aspects, features, and advantages than those described above will become apparent from the following drawings, claims, and detailed description of the disclosure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
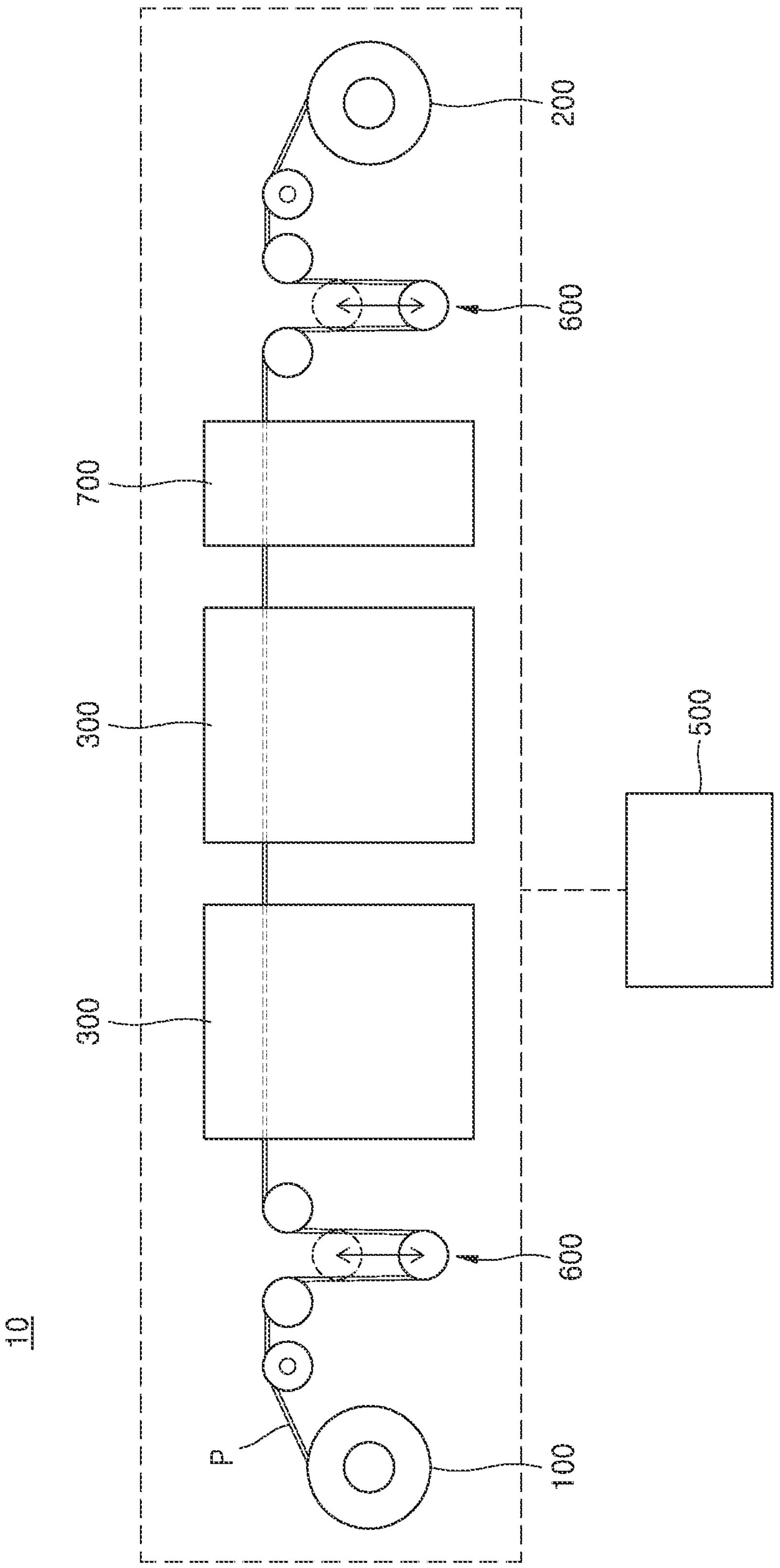
FIG. 1 illustrates a reel-to-reel component drying apparatus according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the disclosure allows for various changes and numerous embodiments, embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, even though illustrated in other embodiments, the same identification numbers are used for the same components.

Hereinafter, exemplary embodiments will be described in detail with reference to the accompanying drawings, and in the description with reference to the drawings, the same or corresponding constituents are indicated by the same reference numerals and redundant descriptions thereof are omitted.

In the following embodiment, it will be understood that although the terms "first," "second," etc. may be used herein to describe various components, these components should not be limited by these terms.

In the following embodiment, the expression of singularity in the specification includes the expression of plurality unless clearly specified otherwise in context.

In the following embodiment, when a part may "include" or "have" a certain constituent element, unless specified otherwise, it may not be construed to exclude another constituent element but may be construed to further include other constituent elements.

Sizes of components in the drawings may be exaggerated for convenience of explanation. For example, since sizes and thicknesses of components in the drawings are arbitrarily illustrated for convenience of explanation, the following embodiments are not limited thereto.

In the following embodiment, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

The terms used in the specification are merely used to describe embodiments, and are not intended to limit the disclosure. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Figure 2:
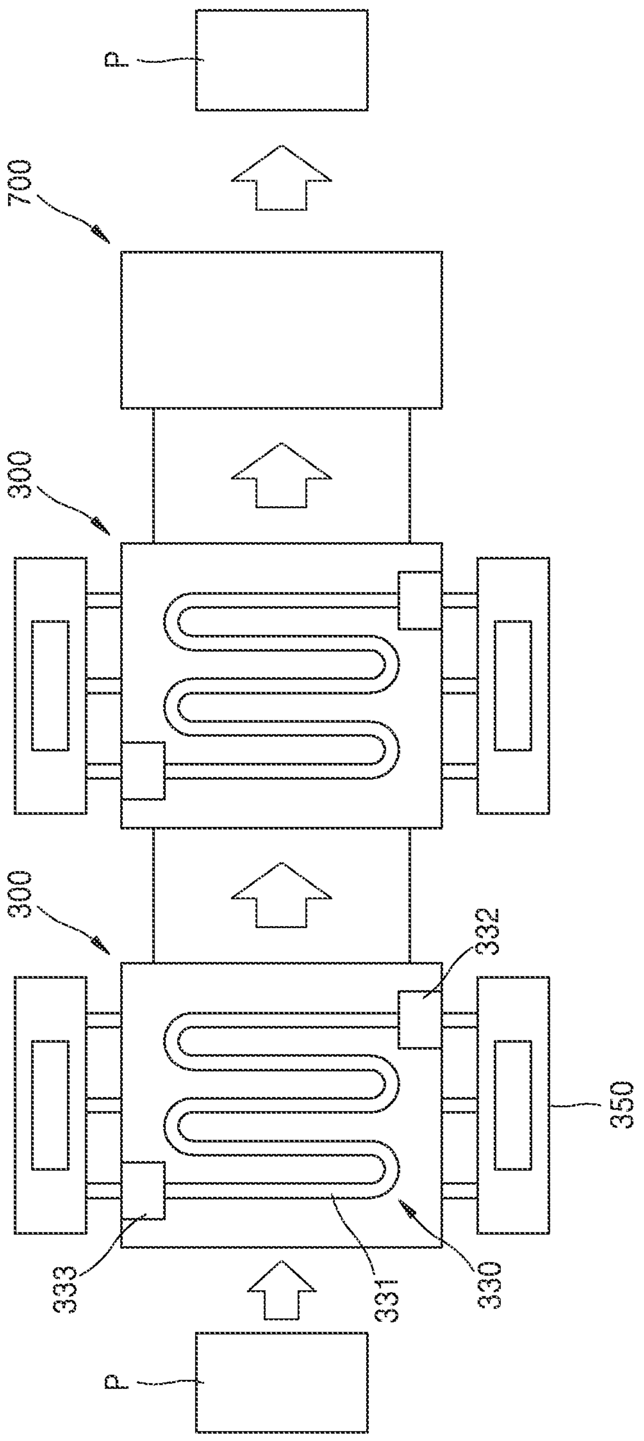
FIG. 2 illustrates a plan view of reel-to-reel component drying apparatus according to an embodiment of the disclosure.
Figure 3:
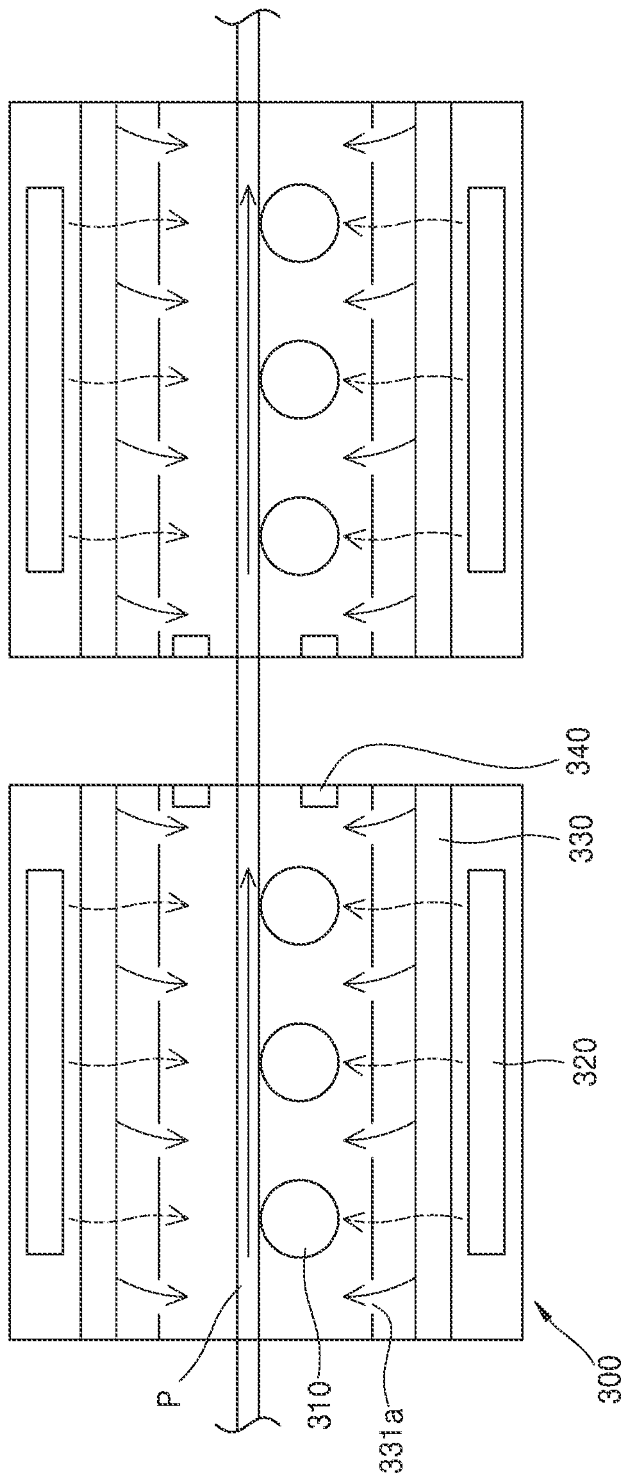
FIG. 3 illustrates a drying chamber according to an embodiment of the disclosure.
Figure 4:
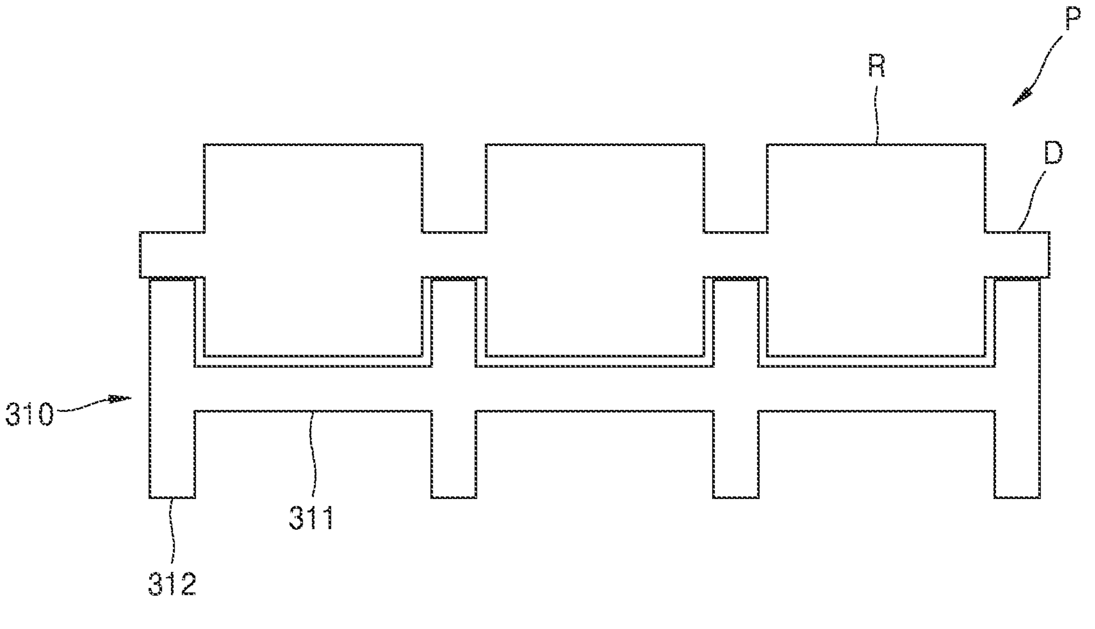
FIG. 4 illustrates a transfer roller according to an embodiment of the disclosure.

FIG. 1 illustrates a reel-to-reel component drying apparatus 10 according to an embodiment of the disclosure, FIG. 2 illustrates a plan view of the reel-to-reel component drying apparatus 10 according to an embodiment of the disclosure, FIG. 3 illustrates a drying chamber 300 according to an embodiment of the disclosure, and FIG. 4 illustrates a transfer roller 310 according to an embodiment of the disclosure.

The reel-to-reel component drying apparatus 10 according to an embodiment of the disclosure (hereinafter, referred to as the drying apparatus 10) may be used to dry or cure solder resist or photo solder resist that is applied to a substrate. For example, the drying apparatus 10 may be used to dry or cure solder resist or photo solder resist that is coated on a printed circuit board through screen printing, roll coating, spray, or the like.

In an embodiment, the drying apparatus 10 dries a component P that is transferred in a reel-to-reel method. In other words, unlike a sheet-type component that is transferred and then stopped until a process is completed in one chamber, the drying apparatus 10 may perform a drying process on the component P by continuously transferring the component P without a pause.

Referring to FIGS. 1 to 4, the drying apparatus 10 according to an embodiment of the disclosure may include an uncoiler 100, a recoiler 200, and a drying chamber 300.

The uncoiler 100 and the recoiler 200 are disposed apart from each other at one side and the other side of the drying apparatus 10. The uncoiler 100 and the recoiler 200 may each include a drum having a cylindrical shape around which the component P is unwound or wound, a driving member for rotating the drum, and the like. While the component P is wound around the uncoiler 100 and the recoiler 200, when the uncoiler 100 and the recoiler 200 are rotated, the component P is moved in a transfer direction. The component P is a member that is attached on a transfer film and the like and transferred through the uncoiler 100 and the recoiler 200, and in an embodiment, the component P may be a package substrate.

The drying chamber 300 is disposed between the uncoiler 100 and the recoiler 200, and dries the component P transferred from the uncoiler 100. In an embodiment, the drying chamber 300 is a member having an inner space, and may be in a closed state except an inlet and an outlet through which the component P passes.

In an embodiment, the drying chamber 300 may include a plurality of drying chambers. For example, as illustrated in FIG. 2, the drying chambers 300 may be arranged in a direction in which the component P is transferred. The component P from the uncoiler 100 may enter the first drying chamber 300 to be primarily dried, enter the second drying chamber 300 to be secondly dried, and then pass through a cooling chamber 700 described below to be discharged. Accordingly, the solder resist and the like applied to the component P may be surely dried.

Although FIG. 2 illustrates only two drying chambers as the drying chamber 300, the number of drying chambers is not limited thereto. Three or more drying chambers may be provided as the drying chamber 300 according to the process conditions, the specifications of the component P, or the like.

In an embodiment, the drying chamber 300 may include a transfer roller 310, an infrared drier 320, and a hot air supplier 330.

As illustrated in FIGS. 1 to 3, the transfer roller 310 may include a plurality of transfer rollers which are arranged inside the drying chamber 300 in the transfer direction of the component P. The transfer roller 310 may transfer the component P by being rotated while the component P is placed on an upper surface thereof.

In an embodiment, the transfer roller 310 may include a step. In detail, as illustrated in FIG. 4, the component P may include a product area R where an actual circuit is formed on a base, and a dummy area D where nothing is formed. The product area R and the dummy area D may be alternately disposed in a width direction, and the product area R protrudes on the base, forming a step with the base and the dummy area D.

When a roller having a generally cylindrical shape is used, the outer circumferential surface of a roller contacts the product area R of the component P, and solder resist, photo solder resist, or the like applied to the component P adheres to the roller. Accordingly, during the next transfer process of the component P, the solder resist and the like adhering to the roller adheres to the component P, and thus, in the process, the component P may be contaminated or quality may be degraded.

To prevent the above issues, the transfer roller 310 according to an embodiment of the disclosure may have a step in the width direction to correspond to the product area R and the dummy area D of the component P. In detail, as illustrated in FIG. 4, the transfer roller 310 includes a plurality of protruding portions 312 and a plurality of concave portions 311, which are alternately arranged in the width direction, so that a plurality of steps may be formed. A height difference between the protruding portion 312 and the concave portion 311 may be greater than a height difference between the product area R and the dummy area D. Accordingly, when the transfer roller 310 transfers the component P, the dummy area D of the component P contacts the protruding portion 312, whereas the product area R does not contact the concave portion 311. Accordingly, in the transfer process, the contamination of the component P by the transfer roller 310 may be prevented.

The infrared drier 320 is disposed at one side of the drying chamber 300, and emits infrared light toward the component P to dry solder resist and the like. In an embodiment, the infrared drier 320 may be disposed in a pair to face each other with the transfer roller 310 therebetween in a height direction. The infrared light emitted from the pair of infrared driers 320 may dry both an upper surface and a lower surface of the component P.

The wavelength or intensity of the infrared light emitted from the infrared drier 320 is not specifically limited. The characteristics of the infrared light may be appropriately selected depending on the specifications of the component P, the number of drying chambers 300, or the like.

The hot air supplier 330 is disposed in the drying chamber 300, and supplies hot air between the infrared drier 320 and the component P, thereby drying the component P with the infrared drier 320. In other words, the drying apparatus 10 according to an embodiment of the disclosure may dry the component P by simultaneously using infrared light and hot air.

In an embodiment, the hot air supplier 330 may include a hot air supply duct 331, a hot air supply pump 332, and a discharge device 333.

The hot air supply duct 331 may be disposed between the transfer roller 310 and the infrared drier 320 inside the drying chamber 300. The hot air supply duct 331 may supply hot air flowing in through the hot air supply pump 332 to the component P. In an embodiment, one hot air supply duct 331 may be disposed between the transfer roller 310 and the infrared drier 320, or when a pair of infrared driers 320 are disposed, two hot air supply duct 331 may be disposed to correspond thereto.

One end of the hot air supply duct 331 may be connected to the hot air supply pump 332, and the other end thereof may be connected to the discharge device 333. Furthermore, the hot air supply duct 331 may include a plurality of supply holes 331*a* to supply hot air to the component P. The supply holes 331*a* may be arranged in the length direction and width direction of the hot air supply duct 331.

In an embodiment, the hot air supply duct 331 may connect the hot air supply pump 332 to the discharge device 333 in a zigzag pattern. For example, as illustrated in FIG. 2, the hot air supply duct 331 extends from the hot air supply pump 332 in one direction, then extends in the opposite direction, and extends again in the original direction, so as to be connected to the discharge device 333 by repeating the above pattern. Accordingly, the component P may be surely dried by increasing a contact area between the component P and hot air increases and an interval of one cycle of drying the component P by using by the hot air.

In an embodiment, the hot air supply duct 331 may extend from the rear end to the front end of the drying chamber 300 to reverse the transfer direction of the component P. For example, as illustrated in FIGS. 2 and 3, the hot air supply pump 332 may be disposed in the rear side of the drying chamber 300, and the discharge device 333 may be disposed in the front side of the drying chamber 300. The hot air through the hot air supply duct 331 may be supplied from the hot air supply pump 332 to be discharged through the discharge device 333. Accordingly, the hot air supplied through the hot air supply duct 331 may be reversed to the transfer direction of the component P.

Through the above configuration, heat transfer is sufficiently performed at the front end of the drying chamber 300 at which the temperature of the component P is relatively low so that hot air having a relatively lowered temperature dries the component P. Hot air having a relatively high temperature because not long time has passed after the hot air flows in dries the component P at the rear end of the drying chamber 300 in which the temperature of the component P is relatively high, so that a temperature gradient between the component P and the hot air may be maintained constant. Accordingly, damage to the component P or degradation of quality due to an excessive temperature difference may be prevented, and a constant drying process may be performed. Furthermore, uniform drying may occur entirely across the drying chamber 300.

The hot air supply pump 332 is connected to one end of the hot air supply duct 331, and supplies externally supplied hot air to the hot air supply duct 331. Although the drawings illustrate that the hot air supply pump 332 is disposed inside the drying chamber 300, the disclosure is not limited thereto. The hot air supply pump 332 may be disposed outside the drying chamber 300, and may be disposed on an outer wall or a side wall of the rear end of the drying chamber 300.

The discharge device 333 is connected to the other end of the hot air supply duct 331, and serves to discharge hot air to the outside. The discharge device 333 may be connected not only to the hot air supply duct 331, but also to the inside of the drying chamber 300. Accordingly, the discharge device 333 discharges the hot air that has completed the drying process to the outside, and the inside of the drying chamber 300 may be maintained in an atmosphere of appropriate temperature and humidity.

In an embodiment, the drying chamber 300 may further include a height measurement device 340 and a height adjustment device 350.

As illustrated in FIG. 3, the height measurement device 340 is disposed at one side of the drying chamber 300, and may measure the height of the component P. The height measurement device 340 measures an average height in the width direction of the component P, that is, the height of the component P in a direction perpendicular to the transfer direction of the component P, and calculate an average thereof.

Furthermore, as illustrated in FIG. 2, the height adjustment device 350 is disposed at at least one side of the drying chamber 300, and may adjust the height of the transfer roller 310. In an embodiment, the height adjustment device 350 may adjust integrally or individually the heights of the transfer rollers 310.

Through the above configuration, the height measurement device 340 measures the height of the component P, and when the average height of the component P exceeds a preset range, the height adjustment device 350 may adjust the height of the component P by adjusting the height of the transfer roller 310. Accordingly, the component P may be efficiently dried.

In an embodiment, when the drying chamber 300 includes a plurality of drying chambers, the height measurement device 340 may be disposed close to the drying chamber 300 that is adjacent thereto. In detail, as illustrated in FIG. 3, when the drying chambers 300 are adjacently disposed, the height measurement device 340 may be disposed at each of the rear end of the drying chamber 300 located in front and the front end of the drying chamber 300 located behind.

Through the above configuration, when the component P is moved from any one drying chamber 300 to another drying chamber 300, the height of the component P is maintained constant so that the component P may be prevented from leaning toward a particular position on the transfer roller 310, and drying efficiency may be improved.

Although FIG. 3 illustrates only two drying chambers 300, three or more drying chambers 300 may be disposed, and the drying chamber 300 disposed between two drying chambers 300 close to each other may include the height measurement device 340 at both of the front end and the rear end of the drying chamber 300.

The drying apparatus 10 may further include a tension adjustment device 600.

In an embodiment, the tension adjustment device 600 may adjust the tension of the uncoiler 100 or the recoiler 200 based on the average height of the component P measured by the height measurement device 340. In detail, the tension adjustment device 600 is disposed in the rear end of the uncoiler 100 or in the front end of the recoiler 200, and may be a buffer roller moving in the height direction. The tension adjustment device 600 moves in the height direction depending on the size of the tension applied to the component P, and a controller 500 described below may control the transfer speed of the component P by the uncoiler 100, the recoiler 200, or the like based on the height of the tension adjustment device 600. Accordingly, the tension applied to the component P is maintained constant, and the height of the component P being transferred may be maintained constant.

The drying apparatus 10 may further include the controller 500.

The controller 500 controls other members of the drying apparatus 10, such as the uncoiler 100, the recoiler 200, the drying chamber 300, the tension adjustment device 600, the cooling chamber 700, and the like. For example, the controller 500 controls an input speed of the component P by controlling the rotation speed of the uncoiler 100, the recoiler 200, and the like, and thus, the tension applied to the component P may be adjusted. Furthermore, the controller 500 may control the rotation speed of the transfer roller 310, the strength or cycle of the infrared drier 320, the air blow amount, speed, and the like of the hot air supplier 330, in the drying chamber 300. Furthermore, the controller 500 may control the height adjustment device 350 or the tension adjustment device 600 based on the height of the component P measured by the height measurement device 340.

The drying apparatus 10 may further include the cooling chamber 700.

As illustrated in FIG. 1, the cooling chamber 700 is disposed in the rear end of the drying chamber 300, and may cool the component P dried in the drying chamber 300. The cooling chamber 700, similar to the drying chamber 300, may include an inner space and a roller for transferring the component P. The cooling chamber 700 cools the component P heated in the drying chamber 300 so that solder resist and the like may be stabilized, and the recoiler 200 may be prevented from being contaminated by solder resist and the like adhering thereto.

A process of processing the component P by using the drying apparatus 10 according to an embodiment of the disclosure is described below with reference to FIGS. 1 to 4.

First, the component P disposed on a transfer film and the like is wound around drums of the uncoiler 100 and the recoiler 200. As the uncoiler 100 and the recoiler 200 rotate, the component P wound around the uncoiler 100 is unwound to move toward the recoiler 200, and then, enters the drying chamber 300.

The component P is transferred by the transfer roller 310 of the drying chamber 300, and the transfer roller 310 may include the concave portion 311 and the protruding portion 312 that is formed not to contact the product area R of the component P and to contact the dummy area D only.

The component P is moved by the transfer roller 310 from the front end to the rear end of the drying chamber 300, and in this process, the component P may be dried by the infrared drier 320 and the hot air supplier 330.

The infrared drier 320 may be provided in a pair to face each other with the transfer roller 310 therebetween in the height direction, and may dry the solder resist and the like on the component P by irradiating infrared light having a certain wavelength to the component P.

The hot air supplier 330 extends from the rear end toward the front end of the drying chamber 300, and includes the hot air supply duct 331 having one end connected to the hot air supply pump 332 and the other end connected to the discharge device 333. The hot air supply duct 331 extends in a direction reverse to the transfer direction of the component P, and may dry the component P by supplying hot air to the component P.

In an embodiment, the drying chamber 300 may include a plurality of drying chambers disposed in the transfer direction of the component P, and the component P that has completed a drying process in one drying chamber 300 may enter the next drying chamber 300 to undergo a drying process again.

In an embodiment, the controller 500 may adjust the height of the component P based on the height of the component P measured by the height measurement device 340 disposed at one side of the drying chamber 300. In detail, the height measurement device 340 measures an average height in the width direction of the component P, and when a measured average height deviates from a preset range, the controller 500 may adjust the height of the transfer roller 310 by using the height adjustment device 350 disposed at one side of the drying chamber 300. Alternatively, when a measured average height deviates from a preset range, the controller 500 may adjust tension applied to the component P by controlling the tension adjustment device 600.

The component P that has passed through the drying chamber 300 enters the cooling chamber 700 to be cooled. The component P that is cooled may be rewound around the recoiler 200.

Through the above configuration, the drying apparatus 10 according to an embodiment of the disclosure may perform a continuous drying and cooling process on the component P that is transferred in a reel-to-reel method.

Furthermore, the drying apparatus 10 according to an embodiment of the disclosure may efficiently dry the component P by using the infrared drier 320 and the hot air supplier 330.

Furthermore, the drying apparatus 10 according to an embodiment of the disclosure measure the height of the component P in real time, and adjust the height of the component P by using the height adjustment device 350 or the tension adjustment device 600, thereby improving the quality of the component P and efficiently performing the drying process.

Figure 5:
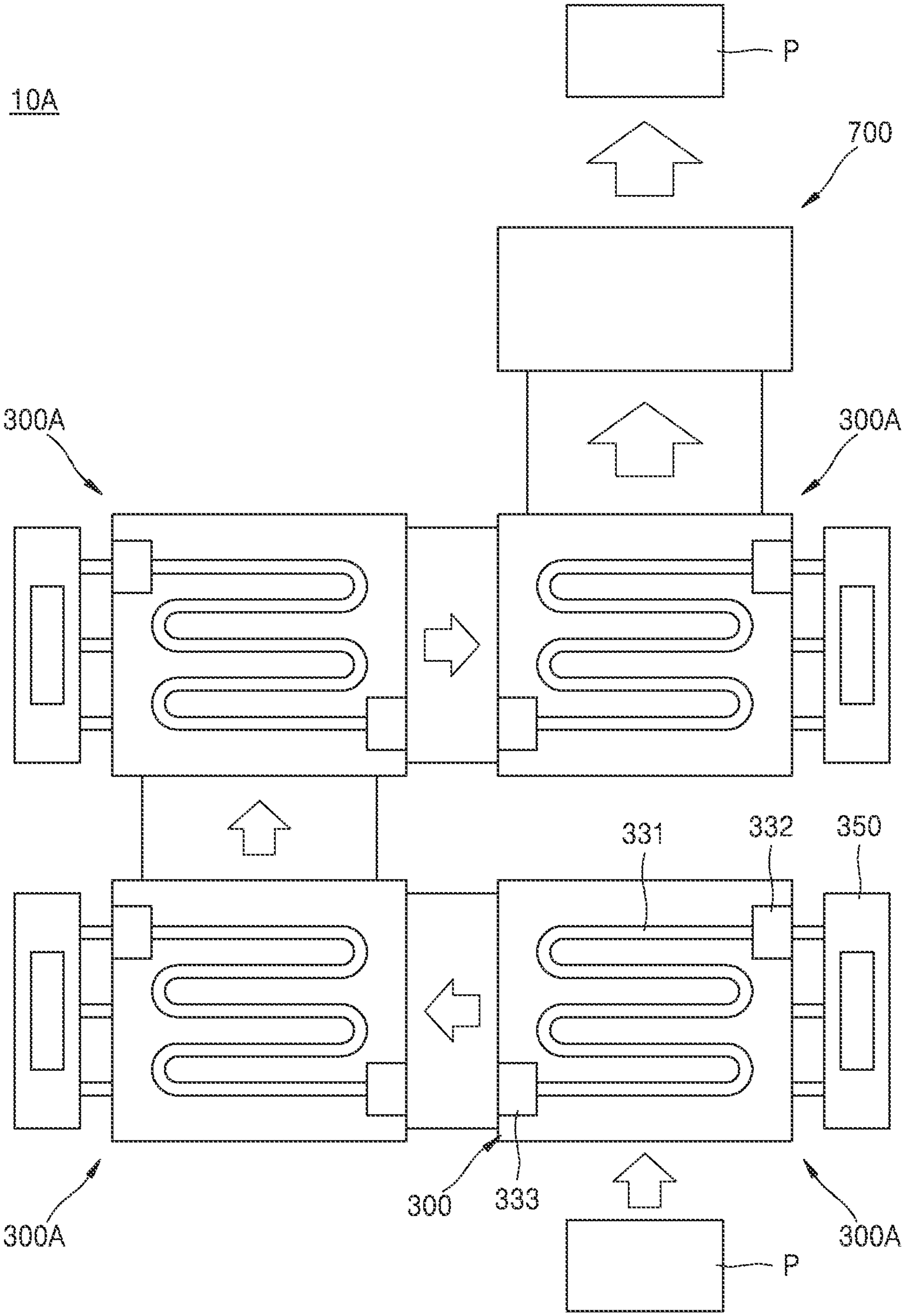
FIG. 5 illustrates a plan view of a component drying apparatus according to another embodiment of the disclosure.

FIG. 5 illustrates a drying apparatus 10A according to another embodiment of the disclosure, when viewed on a plane.

When the drying apparatus 10A is compared with the drying apparatus 10 described above, the configuration of a drying chamber 300A is partially different, and the other configuration may be the same as the configuration of the drying apparatus 10. For example, the drying apparatus 10A, like the drying apparatus 10 of FIG. 1, may include the uncoiler 100, the recoiler 200, the controller 500, the tension adjustment device 600, and the cooling chamber 700.

The drying chamber 300A is disposed between the uncoiler 100 and the recoiler 200 and may dry the component P, and more particularly, to solder resist and the like applied to the component P.

In an embodiment, the drying chamber 300A includes a plurality of drying chambers, and the drying chambers 300A may be alternately disposed in a first direction that is the transfer direction of the component P and in a second direction crossing the first direction.

In detail, as illustrated in FIG. 5, the component P from the uncoiler 100 enters the first drying chamber 300A and after the drying process is complete, may move to the second drying chamber 300A. The second drying chamber 300A may be disposed at one side of the first drying chamber 300A, not in a first direction (the vertical direction of FIG. 5) that is the transfer direction of the component P, but in a second direction (the horizontal direction of FIG. 5) perpendicular to the first direction.

The component P moved to the second drying chamber 300A is dried while being moved again in the first direction, and then, moved to the third drying chamber 300A. The third drying chamber 300A may be disposed at one side of the second drying chamber 300A in the first direction.

The component P moved to the third drying chamber 300A is dried while being moved in the first direction, and then, moved to the fourth drying chamber 300A. The fourth drying chamber 300A may be disposed at one side of the third drying chamber 300A in the second direction. The component P that has completed the drying process in the fourth drying chamber 300A may be moved to the cooling chamber 700.

As such, as the drying chambers 300A are arranged not linearly, but alternately in the horizontal direction and the vertical direction, on a plane, the drying apparatus 10A may efficiently perform the drying process by reducing the total length of the drying apparatus 10A.

Although FIG. 5 illustrates four drying chambers 300A only, the disclosure is not limited thereto, and the number of the drying chambers 300A may be three or more.

As such, although embodiments have been described, these are merely exemplary. Those skilled in the art to which the present disclosure pertains could make various modifications and changes from these descriptions. Accordingly, the technical protection scope of the disclosure should be construed based on the accompanying claims.

The specific technical content described in an embodiment is merely an embodiment, not defining the technical scope of the embodiment. In order to describe the description of the invention concisely and clearly, the description of the general technology and configuration according to the related art may be omitted. Furthermore, connection lines or connection members between the constituent elements shown in the drawings are merely illustrative of functional connections and/or physical or circuit connections. In an actual device, a connection between the constituent elements may be indicated by various functional connections, physical connections, or circuit connections that can be replaced or added. Furthermore, no item or component is essential to the practice of the disclosure unless the element is specifically described as “essential” or “critical.”

The use of terms “a” and “an” and “the” and similar referents in the context of describing the disclosure are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Furthermore, the steps of all methods described herein can be performed in any suitable order unless otherwise indicated herein or otherwise clearly contradicted by context. The embodiment is not limited to the described order of the steps. The use of any and all examples, or language (e.g., “such as”) provided herein, is intended merely to better illuminate the disclosure and does not pose a limitation on the scope of the disclosure unless otherwise claimed. Furthermore, numerous modifications and adaptations will be readily apparent to those of ordinary skill in this art without departing from the spirit and scope of the disclosure.

The drying apparatus according to an embodiment of the disclosure may perform a continuous drying and cooling process on a component transferred by a reel-to-reel method.

The drying apparatus according to an embodiment of the disclosure may efficiently dry a component by using simultaneously the infrared drier and the hot air supplier.

The drying apparatus according to an embodiment of the disclosure may increase the quality of a component and efficiently perform a drying process by measuring the component height in real time, and adjusting the component height by using the height adjustment device or the tension adjustment device.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for drying a component transferred in a reel-to-reel method, the apparatus comprising:

an uncoiler and a recoiler, both transferring the component;

a drying chamber disposed between the uncoiler and the recoiler and drying the component, wherein the drying chamber includes an inner space;

a transfer roller for transferring the component; an infrared drier for irradiating infrared light toward the component; and a hot air supplier for supplying hot air between the infrared drier and the component, wherein the transfer roller includes a plurality of transfer rollers which are arranged inside the drying chamber in the transfer direction of the component, the component including a product area protruding from a base and a dummy area disposed between neighboring product areas, the product area and the dummy area being alternately disposed, and the transfer rollers include a plurality of steps formed not to contact the product area but to contact the dummy area only.

2. The apparatus of claim 1, wherein the infrared drier comprises a pair of infrared driers disposed in a height direction to face each other with the transfer roller therebetween.

3. The apparatus of claim 1, wherein the hot air supplier comprises: in the drying chamber, a hot air supply duct disposed between the transfer roller and the infrared drier; a hot air supply pump for supplying hot air from outside into the hot air supply duct; and a discharge device for discharging the hot air from inside the drying chamber to the outside.

4. The apparatus of claim 3, wherein the hot air supply duct extends from a rear end to a front end of the drying chamber in the reverse direction of the conveyed component.

5. The apparatus of claim 1, wherein the drying chamber comprises a plurality of drying chambers, and each of the plurality of drying chambers comprises a height measurement device for measuring an average height of the component in a width direction, the height measurement device being disposed close to an adjacent drying chamber.

6. The apparatus of claim 5, further comprising a height adjustment device for controlling a height of the transfer roller based on the average height measured by the height measurement device.

7. The apparatus of claim 5, further comprising a tension adjustment device disposed in the uncoiler or the recoiler, and adjusting a tension of the uncoiler or the recoiler based on the average height measured by the height measurement device.

8. The apparatus of claim 7, wherein the tension adjustment device is disposed in a rear end of the uncoiler or in a front end of the recoiler, and comprises a buffer roller moving in a height direction.

9. The apparatus of claim 1, further comprising a cooling chamber disposed in a rear end of the drying chamber and cooling the component.

10. The apparatus of claim 1, wherein the component comprises a product area protruding from a base and a dummy area disposed between neighboring product areas, the product area and the dummy area being alternately disposed, and the transfer roller comprises a plurality of steps formed not to contact the product area but to contact the dummy area only.

* * * * *